(12) United States Patent
Lee (10) Patent No.: US 10,822,019 B2
(45) Date of Patent: Nov. 3, 2020

(54) RACK-ASSIST-TYPE ELECTRIC POWER STEERING APPARATUS

(71) Applicant: MANDO CORPORATION, Gyeonggi-do (KR)

(72) Inventor: Jong Hoon Lee, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 217 days.

(21) Appl. No.: 16/162,485

(22) Filed: Oct. 17, 2018

(65) Prior Publication Data

US 2019/0161110 A1  May 30, 2019

(30) Foreign Application Priority Data

Nov. 30, 2017 (KR) .......................... 10-2017-0163537

(51) Int. Cl.
| | |
|---|---|
| *B62D 5/04* | (2006.01) |
| *F16H 57/00* | (2012.01) |
| *F16H 7/02* | (2006.01) |
| *F16H 55/49* | (2006.01) |
| *B62D 7/22* | (2006.01) |

(52) U.S. Cl.
CPC .......... *B62D 5/0424* (2013.01); *B62D 5/0448* (2013.01); *B62D 7/226* (2013.01); *F16H 7/02* (2013.01); *F16H 55/49* (2013.01); *F16H 57/0006* (2013.01)

(58) Field of Classification Search
CPC ....... B62D 5/0442–5/0448; B62D 5/04; B62D 5/0421; B62D 5/0424; F16H 7/023
See application file for complete search history.

(56) References Cited

U.S. PATENT DOCUMENTS

| | | | |
|---|---|---|---|
| 7,823,687 B2* | 11/2010 | Spengler | F16H 7/08 180/444 |
| 2019/0162282 A1* | 5/2019 | Boksenberg | F16H 25/2204 |

FOREIGN PATENT DOCUMENTS

KR  20160074755 A  *  6/2016

* cited by examiner

*Primary Examiner* — Kevin Hurley
(74) *Attorney, Agent, or Firm* — Ladas & Parry, LLP

(57) ABSTRACT

A rack-assist-type electric power steering apparatus may include: a motor pulley provided on or coupled to a shaft of a motor; a nut pulley provided on or coupled to an outer circumferential surface of a ball nut coupled to a rack bar via a ball; a belt coupled to the motor pulley and the nut pulley, the belt comprising provided with one or more first magnetic bodies; and a rack housing enclosing or housing at least a portion of the motor pulley, the nut pulley and the belt are housed. The rack housing may comprise one or more second magnetic bodies provided on an inner circumferential surface thereof facing or opposite to the belt. Alternatively, the rack housing may comprise a support portion protruding from an inner surface of the rack housing, and one or more second magnetic bodies may be provided on a surface of the support portion.

15 Claims, 8 Drawing Sheets

RACK-ASSIST-TYPE ELECTRIC POWER STEERING APPARATUS

CROSS REFERENCE TO RELATED APPLICATION

This application claims priority to Korean Patent Application No. 10-2017-0163537, filed on Nov. 30, 2017, which is hereby incorporated by reference for all purposes as if fully set forth herein.

BACKGROUND

1. Technical Field

Some embodiments of the present disclosure generally relate to an electric power steering apparatus, and more particularly to a rack-assist-type electric power steering apparatus comprising magnet bodies on a belt and/or rack housing.

2. Description of the Related Art

A general rack-assist-type electric power steering apparatus may include a steering system extending from a steering wheel to opposite side vehicle wheels and an auxiliary power mechanism that supplies auxiliary steering power to the steering system. A belt-type power transmission apparatus is one of auxiliary power mechanisms in such a general rack-assist-type electric power steering apparatus.

However, in the conventional technique, there may be a problem in that noise and vibration are generated through the rack housing or the like due to chord vibration occurring in the belt when the motor pulley is rotated.

In addition, when the belt is operated by the motor, the tension of the belt may be changed during continuous operation of the motor in the forward and reverse directions, and thus appropriate steering assist force may not be generated. Thus, wear and breakage may occur in the belt, the motor pulley, the nut pulley, or the like, and the durability of the belt, the motor pulley, the nut pulley, or the like may be lowered.

It is with respect to these and other general considerations that the following embodiments have been described. Also, although relatively specific problems have been discussed, it should be understood that the embodiments should not be limited to solving the specific problems identified in the background.

SUMMARY

According to various exemplary embodiments of the present disclosure, a rack-assist-type electric power steering apparatus may prevent chord vibration of a belt, which occurs when a motor pulley is continuously rotated in forward and reverse directions by the driving force of a motor, so as to reduce the noise of a rack housing.

According to some exemplary embodiments of the present disclosure, a rack-assist-type electric power steering apparatus may maintain the constant tension of a belt coupled to a motor pulley and a nut pulley even when the motor pulley is continuously rotated in the forward and reverse directions by the driving force of a motor.

According to certain exemplary embodiments of the present disclosure, a rack-assist-type electric power steering apparatus may include: a motor pulley provided on or coupled to a shaft of a motor; a nut pulley provided on or coupled to an outer circumferential surface of a ball nut coupled to a rack bar via a ball; a belt rotatably coupled to the motor pulley and the nut pulley, the belt comprising or provided with one or more first magnetic bodies; and a rack housing enclosing or housing at least a portion of the motor pulley, the nut pulley and the belt, the rack housing comprising or provided with one or more second magnetic bodies on the inner circumferential surface thereof opposite the belt.

According to some exemplary embodiments of the present disclosure, a rack-assist-type electric power steering apparatus include: a motor pulley provided on or coupled to a shaft of a motor; a nut pulley provided on or coupled to an outer circumferential surface of a ball nut coupled to a rack bar via a ball; a belt coupled to the motor pulley and the nut pulley, the belt comprising or provided with one or more first magnetic bodies; and a rack housing enclosing or housing at least a portion of the motor pulley, the nut pulley and the belt, the rack housing comprising or provided with a support portion protruding from an inner wall of the rack housing between the motor pulley and the nut pulley. The support portion may include one or more second magnetic bodies on an outer surface of the rack housing facing or opposite to the belt.

According to the present embodiments, it is possible to prevent the chord vibration of the belt, which occurs when the motor pulley is continuously rotated in the forward and reverse directions by the driving force of the motor, thereby reducing the noise of the entire rack housing.

In addition, even if the motor pulley is continuously rotated in the forward and reverse directions by the driving force of the motor, the tension of the belt coupled to the motor pulley and the nut pulley can be maintained constant.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
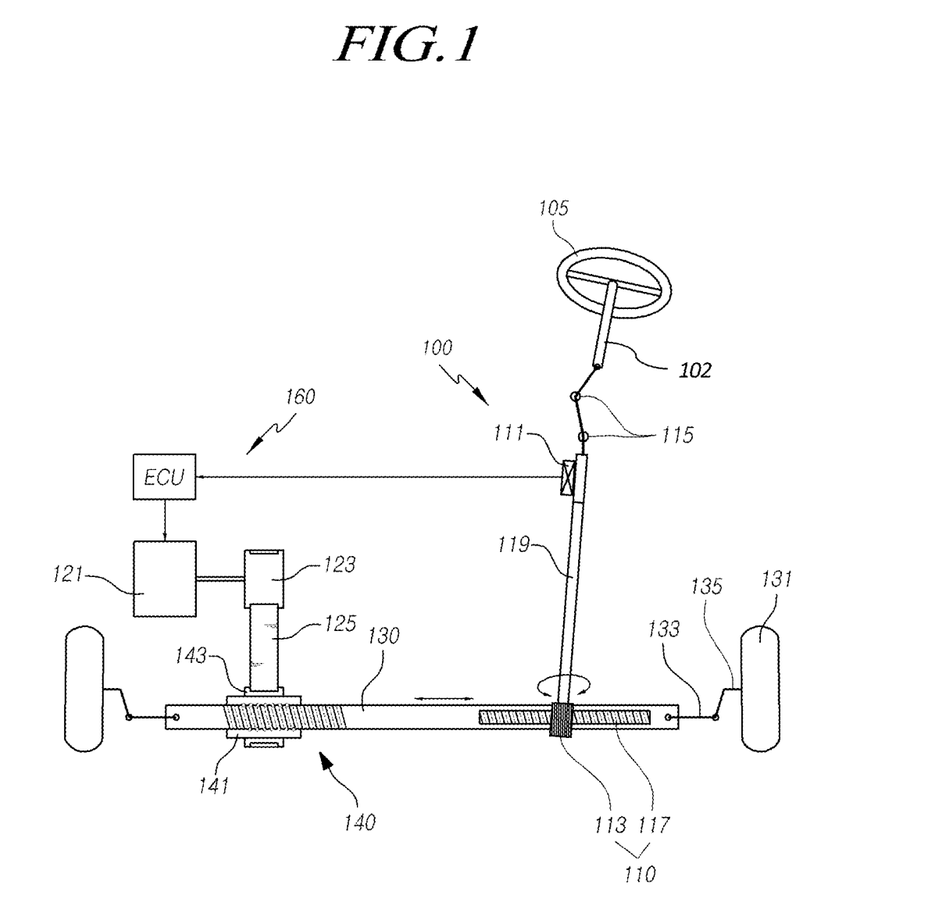
FIG. 1 shows a schematic diagram of a rack-assist-type electric power steering apparatus according to exemplary embodiments of the present disclosure.
Figure 2:
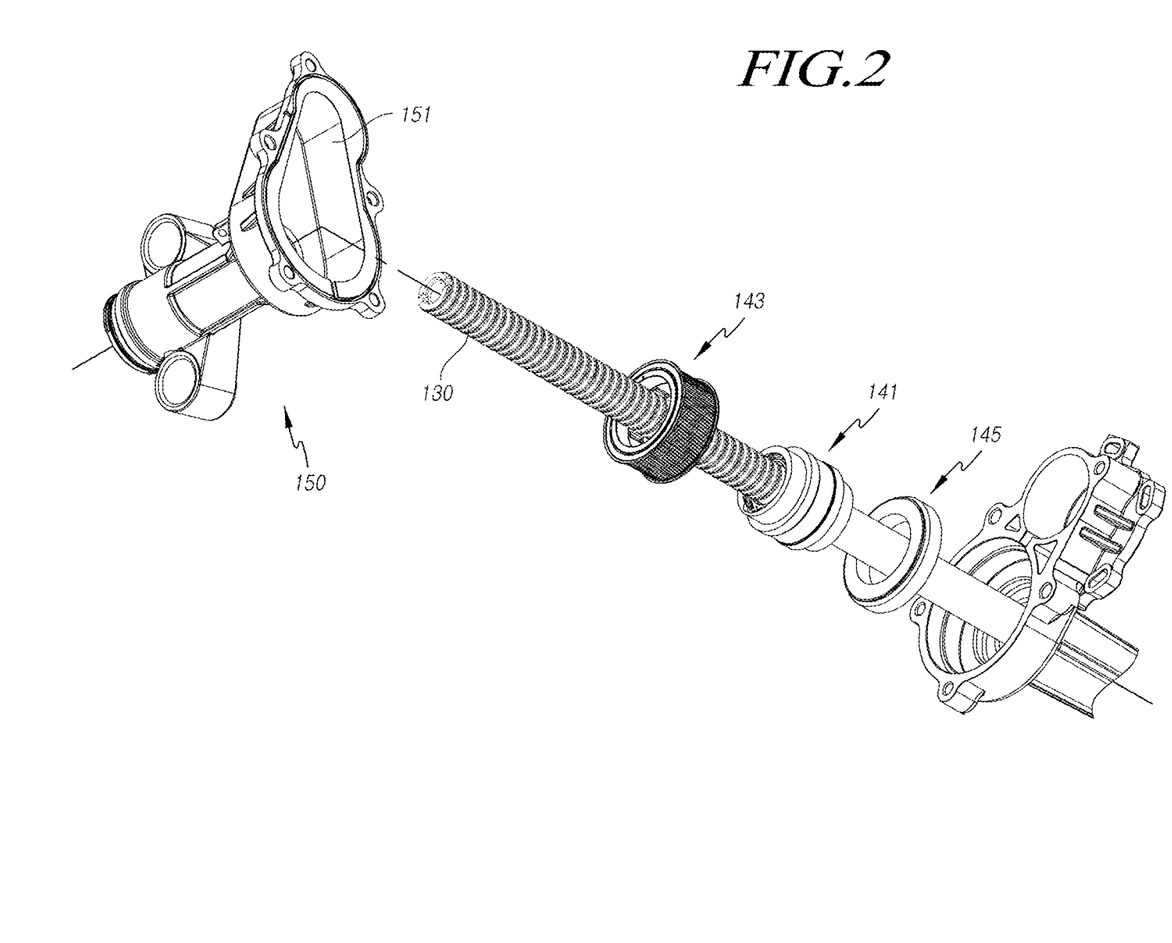
FIG. 2 shows an exploded partial view of a rack-assist-type electric power steering apparatus according to exemplary embodiments of the present disclosure.
Figure 3:
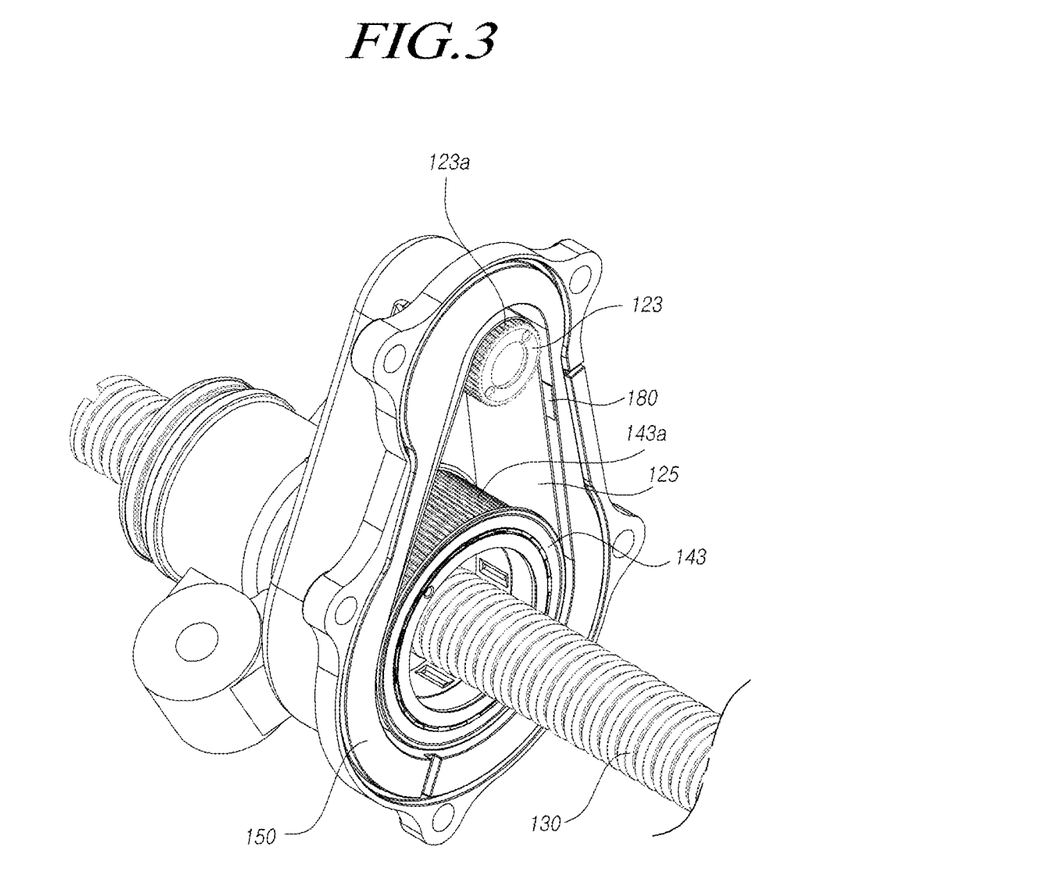
FIG. 3 shows a perspective partial view of a rack-assist-type electric power steering apparatus according to exemplary embodiments of the present disclosure.

FIG. 1 shows a schematic diagram of a rack-assist-type electric power steering apparatus according to exemplary embodiments of the present disclosure, FIG. 2 shows an exploded partial view of a rack-assist-type electric power steering apparatus according to exemplary embodiments of the present disclosure, FIG. 3 is a perspective partial view of a rack-assist-type electric power steering apparatus according to exemplary embodiments of the present disclosure, and FIGS. 4 to 8 are cross-sectional partial views of a rack-assist-type electric power steering apparatus according to exemplary embodiments of the present disclosure.

A rack-assist electric power steering apparatus according to various exemplary embodiments of the present disclosure may include one or more of a motor pulley 123, a nut pulley 143, a belt 125, and a rack housing 150. The motor pulley 123 may be coupled to, or formed on, a shaft of a motor 121. For example, the motor pulley 123 is fixedly connected to the shaft of the motor 121. The nut pulley 143 may be coupled to a ball nut 141, for example, but not limited to, an outer circumferential surface of the ball nut 141. For instance, the nut pulley 143 is fixedly connected to the outer surface of the ball nut 141. The ball nut 141 may be rotatably coupled to a rack bar 130 via balls. The belt 125 may be coupled to the motor pulley 123 and the nut pulley 143. The belt 125 may comprise a first magnetic body 170. The rack housing 150 may enclose or house at least a portion of the motor pulley 123, the nut pulley 143, and the belt 125. The rack housing 150 may have a second magnetic body 180. For instance, the second magnetic body 180 may be provided on an inner circumferential surface 151. The second magnetic body 180 may face, or be disposed opposite to, the belt 125.

The rack-assist electric power steering apparatus according to the certain exemplary embodiments may include at least one of a steering system 100 and an auxiliary power mechanism 160. The steering system 100 may extend or continue from a steering wheel 105 to opposite vehicle wheels 131. The auxiliary power mechanism 160 may be configured to supply steering assist power to the steering system 100.

The steering system 100 may include a steering shaft 102. The steering shaft 102 may be connected to the steering wheel 105 so as to be rotated together with the steering wheel 105. The steering shaft 102 may be connected to a pinion shaft 119 via a pair of universal joints 115. For example, the upper end of the steering shaft 102 may be coupled to the steering wheel 105 and the lower end of the steering shaft 102 may be coupled to the joints 115 or the pinion shaft 119. In addition, the pinion shaft 119 may be connected to the rack bar 130 through a rack-and-pinion mechanism 110, and the opposite ends of the rack bar 130 may be respectively connected to the vehicle wheels 131 through tie rods 133 and knuckle arms 135.

The rack-and-pinion mechanism 110 may include a pinion gear 113 and a rack gear 117. The pinion gear 113 may be disposed at the lower end of the pinion shaft 119. The rack gear 117 may be disposed on at least one side of the outer circumferential surface of the rack bar 130, in which the pinion gear 113 and the rack bar 117 are engaged with each other.

The auxiliary power mechanism 160 may include one or more of a torque sensor 111, an Electronic Control Unit (ECU), a motor 121, and a belt-type transmission 140. The torque sensor 111 may be configured to sense steering torque that is applied to the steering wheel 105 by a driver and to output an electric signal that is proportional to the sensed torque. The ECU may be configured to generate a control signal based on the electric signal transmitted from the torque sensor 111. The motor 121 may be configured to generate auxiliary power based on the control signal transmitted from the ECU. The belt-type transmission 140 may be configured to transmit the auxiliary power generated from the motor 121 to the rack bar 130 via the belt 125.

The belt-type transmission 140 may include one or more of the motor 121, the motor pulley 123, the ball nut 141, the nut pulley 143, and the belt 125. The motor 121 may be controlled by the ECU. The motor pulley 123 may be fixed to, or formed on, the shaft of the motor 121. The ball nut 141 may be configured to support the rack bar 130. The nut pulley 143 may be coupled to the ball nut 141. For example, the nut pulley 143 may be fixedly coupled to the outer circumferential surface of the ball nut 141. The belt 125 may be wound around the motor pulley 123 and the nut pulley 143, and the like. For instance, the belt 125 may rotatably connect between the motor pulley 123 and the nut pulley 143.

The ball nut 141 may be rotatably coupled to the rack bar 130 via a ball and may cause the rack bar 130 to slide inside the housing 150. A bearing 145 may be mounted on the outer circumferential surface of the ball nut 141 in order to support the rotation of the ball nut 141.

At least a portion of the ball nut 141, the rack bar 130, the motor pulley 123, the nut pulley 143, the belt 125, and the like may be disposed or housed inside the rack housing 150. In order to prevent noise from being generated due to the chord vibration of the belt 125, which may occur when the motor pulley 123 is rotated by the driving force of the motor 121, the belt 125 is provided with a first magnetic body 170 and the rack housing 150 is provided with a second magnetic body 180.

For example, the belt 125 may have a belt uneven portion 125a on the inside thereof so as to prevent slippage and may be formed in an integrally connected annular shape. The belt 125 may be rotatably coupled to the motor pulley 123 and the nut pulley 143 on the opposite sides thereof so as to transmit the driving force of the motor pulley 123 to the nut pulley 143. The belt 125 may comprise the first magnetic body 170 so that the belt 125 can be movable by the magnetic force acting between the first magnetic body 170 and the second magnetic body 180 of the rack housing 150.

The rack housing 150, in which the motor pulley 123, the nut pulley 143, and the belt 125 are housed, may comprise the second magnetic body 180. For instance, the second magnetic body 180 may be disposed on the inner circumferential surface 151 of the rack housing 150 and the second magnetic body 180 may be disposed opposite to the belt 125, whereby the belt 125 can be moved by the magnetic force applied to the first magnetic body 170 provided thereon.

Figure 4:
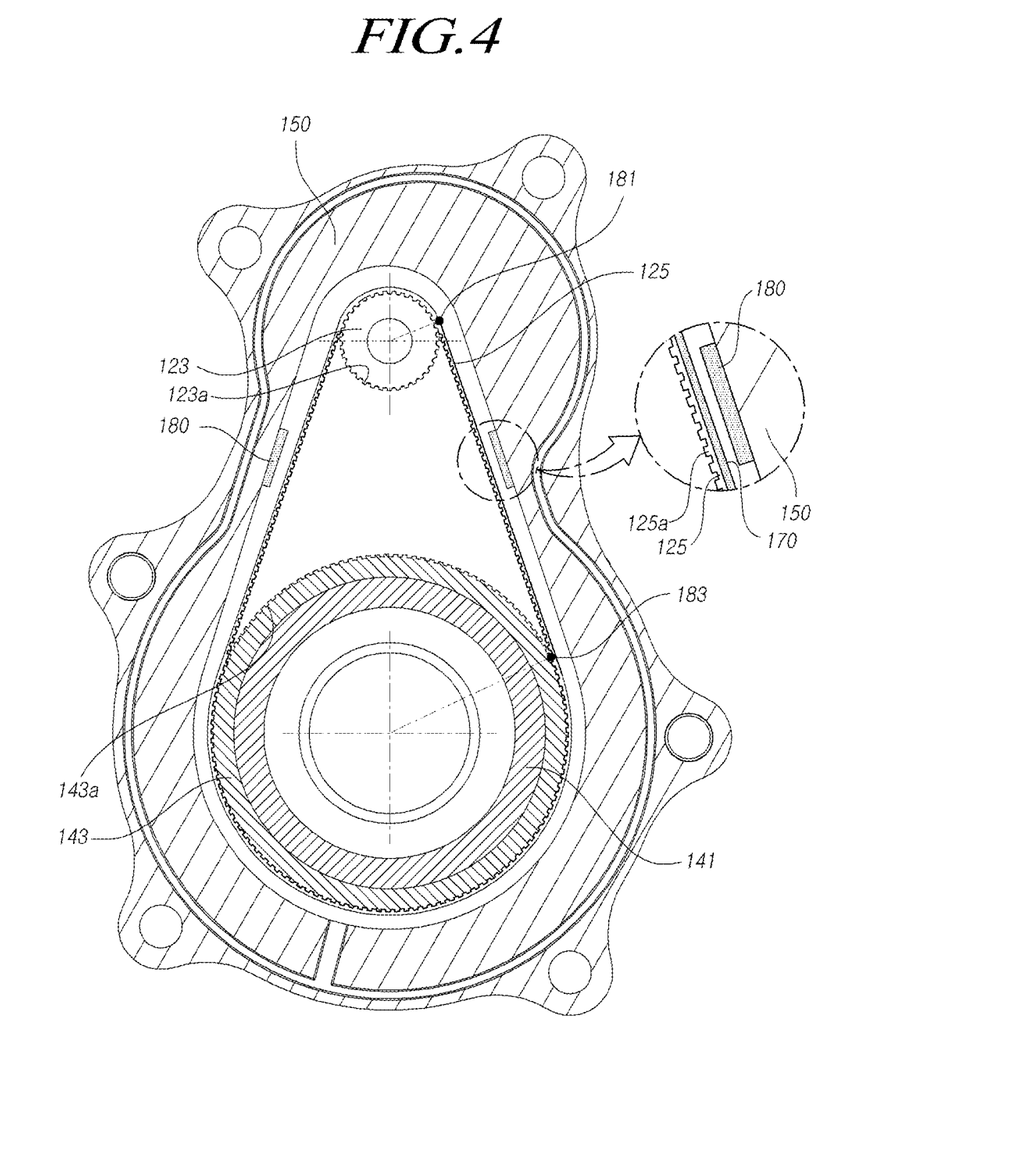
FIGS. 4 to 8 are cross-sectional partial views of a rack-assist-type electric power steering apparatus according to exemplary embodiments of the present disclosure.
Figure 5:
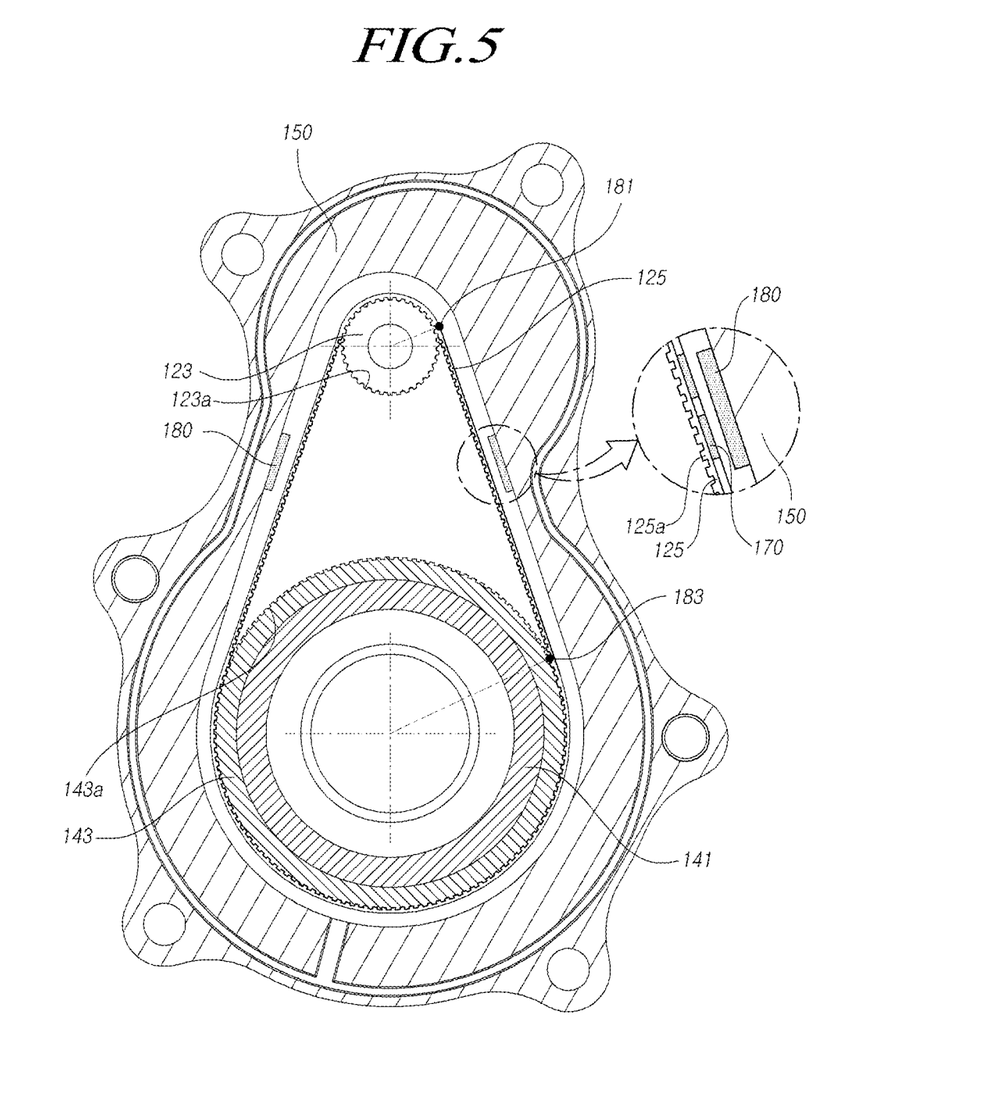

For example, the first magnetic body 170 may be integrally provided around the entire outer surface of the belt 125, as illustrated in FIG. 4. Alternatively, the plurality of first magnetic bodies 170 may be provided along the outer surface of the belt 125 so as to be spaced apart from each other, as illustrated in FIG. 5.

The first magnetic body 170 and the second magnetic body 180 may have different or opposite magnetizations (for example, N-pole/S-pole or S-pole/N-pole) on the surfaces facing each other so that attractive force can be generated therebetween.

Figure 6:
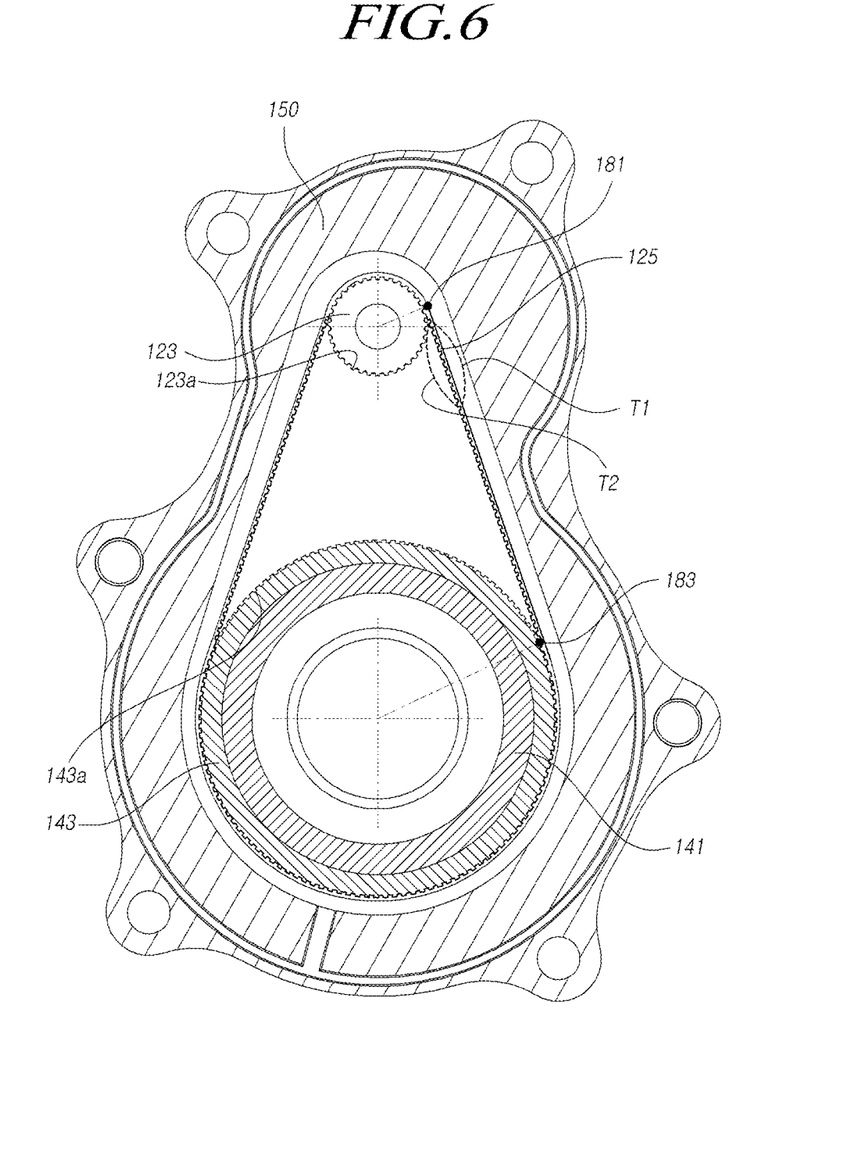

Referring to FIG. 6 illustrating an exemplary embodiment of the present disclosure that does not include the first magnetic body 170 and the second magnetic body 180, while the rotation of the motor pulley 123 is performed or continued in the forward and reverse directions, the belt 125 may be continuously subjected to deformation in which the belt 125 is pushed toward the inner circumferential surface 151 of the rack housing 150 (T1 state) or deformation in which the belt 125 is pushed against the inner circumferential surface 151 of the rack housing 150, or toward the opposite side of the inner circumferential surface 151 of the rack housing 150 (T2 state), in the portion where the outer circumferential surface of the motor pulley 123 abuts the inner surface of the belt 125.

In the T2 state that the deformation in which the belt 125 is pushed against the inner circumferential surface 151 or the rack housing 150, or to the opposite side of the inner circumferential surface 151 of the rack housing 150, is occurred, the contact area between the belt uneven portion 125a, provided on the inner surface of the belt 125, and a motor uneven portion 123a of the motor pulley 123 and the contact area between the belt uneven portion 125a and a nut uneven portion 143a of the nut pulley 143 may be widened, and thus operation noise occurs and the load applied thereto is increased.

However, some exemplary embodiment of the present disclosure including the second magnetic bodies 180, which are provided on the rack housing 150 so as to generate the force of pulling the belt 125 toward the inner circumferential surface 151 of the rack housing 150 so as to return the belt 125 to the original position thereof may provide the attractive force between the first magnetic body 170 and the second magnetic body(ies) 180.

In addition, the second magnetic body(ies) 180 may be provided on the inner circumferential surface 151 of the rack housing 150 between the center axes of the motor pulley 123 and the nut pulley 143, and therefore the attractive force can be applied to the belt 125 at the position where the chord vibration of the belt 125 occurs most severely.

For example, the second magnetic bodies 180 may be provided on the inner circumferential surface at substantially symmetrical positions on the opposite sides of the rack housing 150 with respect to a plane perpendicular to the center axes of the motor pulley 123 and the nut pulley 143, so that the attractive force can be applied to the belt 125 at a position where the chord vibration of the belt 125 occurs most severely.

In order to ensure that the attractive force can be applied to the belt 125 at the position where the chord vibration of the belt 125 occurs most severely, a first contact portion 181, at which the outer circumferential surface of the motor pulley 123 and the inner surface of the belt 125 start to come into contact with each other, and a second contact portion 183, at which the outer circumferential surface of the nut pulley 143 and the inner surface of the belt 125 start to come into contact with each other, may be provided, and the second magnetic body 180 may be provided on the inner circumferential surface 151 of the rack housing 150 closest to the intermediate position between the first contact portion 181 and the second contact portion 183. However, the second magnetic body 180 may be disposed at any portion of the rack housing 150 between the first contact portion 180 and the second contact portion 183.

Even in this case, the second magnetic bodies 180 may be provided on the inner circumferential surface 151 at symmetrical positions on the opposite sides of the rack housing 150 with respect to a plane perpendicular to the center axes of the motor pulley 123 and the nut pulley 143, so that the attractive force can be applied to the belt 125 at the position where the chord vibration of the belt 125 occurs most severely.

Figure 7:
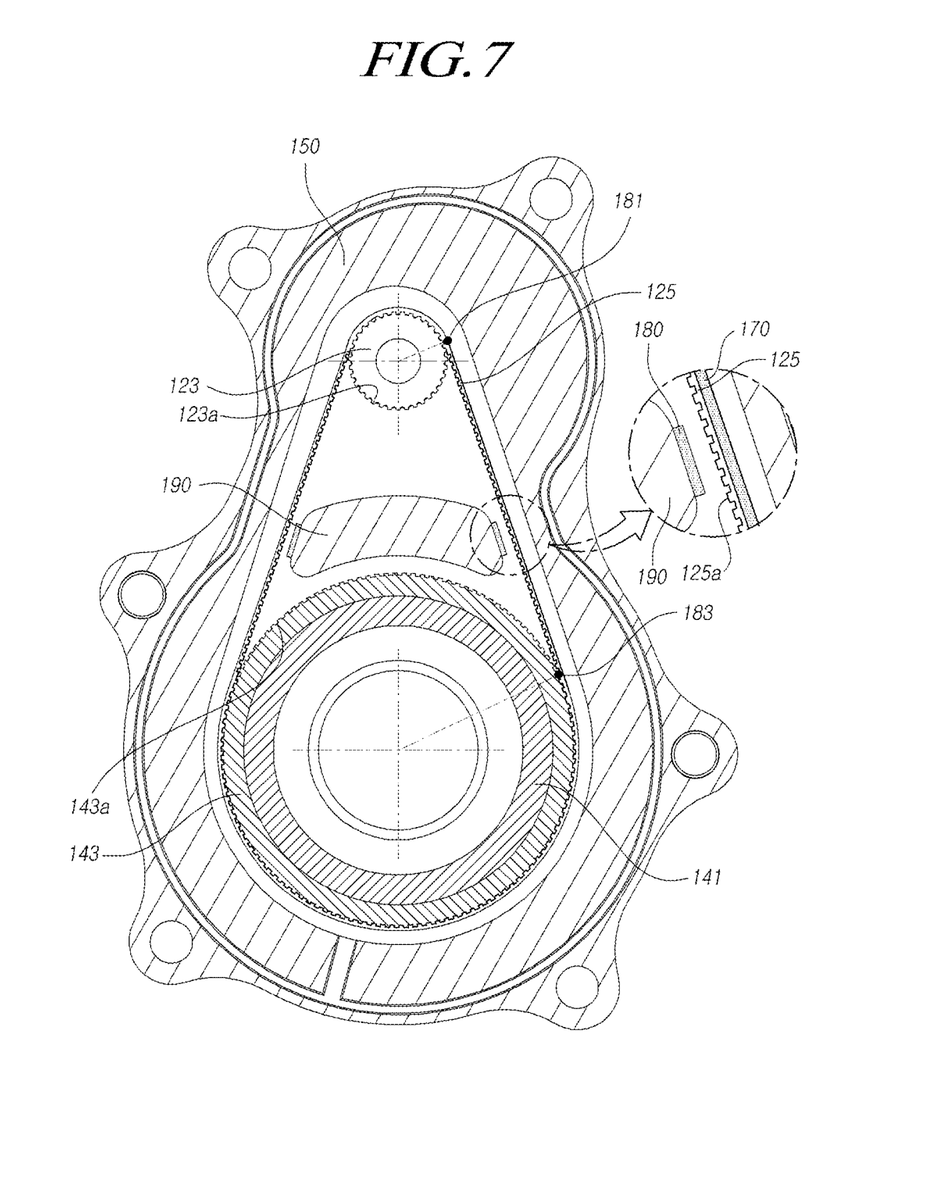
Figure 8:
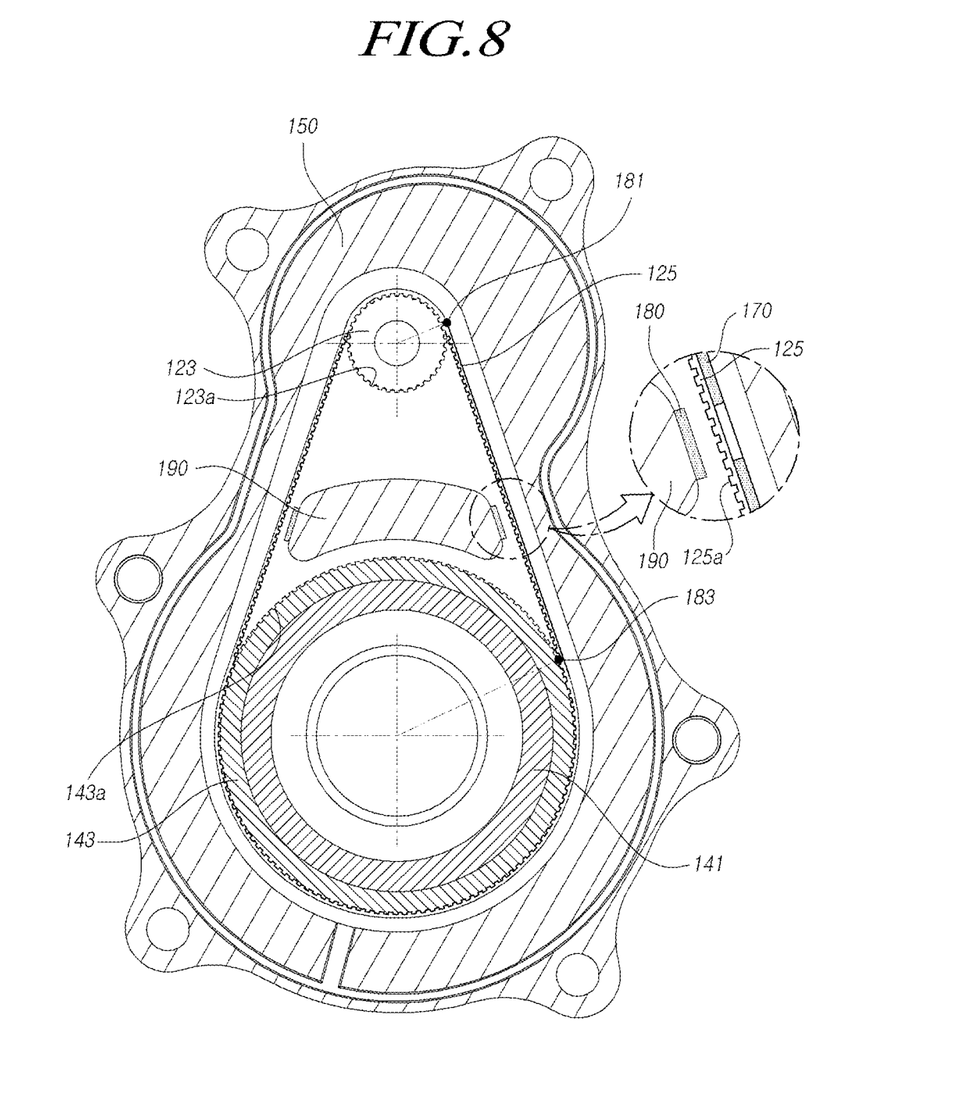

As illustrated in FIGS. 7 and 8, a rack-assist-type electric power steering apparatus according to exemplary embodiments of the present disclosure may include one or more of a motor pulley 123, a nut pulley 143, the belt 125, and a rack housing 150. The motor pulley 123 may be coupled to a shaft of a motor 121. The nut pulley 143 may be coupled to an outer circumferential surface of a ball nut 141 coupled to a rack bar 130 via a ball. The belt 125 may be coupled to the motor pulley 123 and the nut pulley 143 and may comprise a first magnetic body 170. The rack housing 150 may enclose or house at least a portion of the motor pulley 123, the nut pulley 143, and the belt 125. The rack housing 150 may comprise a support portion 190 protruding from the inner wall between the motor pulley 123 and the nut pulley 143. The rack housing 150 may further include one or more second magnetic bodies 180 on its outer surface facing, or disposed opposite to, the belt 125, for example, the outer surface of the support portion 190 of the rack housing 150.

As shown in FIGS. 7 and 8, the support portion 190 may be added to the exemplary embodiments shown in FIGS. 2-6, and the second magnetic bodies 180 may be provided on the outer surface of the support portion 190, rather than on the inner circumferential surface 151 of the rack housing 150.

In these exemplary embodiments, the first magnetic body 170 and the second magnetic bodies 180 may be disposed or provided such that their surfaces facing each other have the same magnetism so as to generate repulsive force with each other.

This will be further described with reference to FIG. 6, which illustrates the exemplary embodiment that does not include the first magnetic body 170 and the second magnetic body 180. Among deformation, in which the belt 125 is pushed toward the rack housing 150 (T1 state), and deformation, in which the belt 125 is pushed against the rack housing 150 or toward the side opposite the rack housing 150 (T2 state), in the T2 state that the deformation in which the belt 125 is pushed against the rack housing 150 or toward the side opposite the rack housing 150 is occurred, the second magnetic bodies 180, which are provided on the support portion 190 to generate the force of pulling the belt 125 toward the rack housing 150, thereby returning the belt 125 to the original position thereof, may be provided in order to generate repulsive force with the first magnetic body 170.

Accordingly, the second magnetic bodies 180 may be disposed to have the same magnetism (N-pole/N-pole or S-pole/S-pole) on the surfaces of the support portion 190 facing the first magnetic body 170 provided on the belt 125, thereby pushing the belt 125 toward the inner circumferential surface 151 of the rack housing 150 so that the belt 125 can be operated while maintaining the original position thereof.

In addition, as described above, for example, the first magnetic body 170 may be integrally provided around the entire outer surface of the belt 125. In another example, the plurality of first magnetic bodies 170 may be provided along the outer surface of the belt 125 so as to be spaced apart from each other.

The support portion 190 may protrude from the inner wall of the rack housing 150, which corresponds to the position where the outer circumferential surfaces of the motor pulley 123 and the nut pulley 143 are closest to each other, and the support portion 190 may be positioned or provided such that the opposite lateral sides of the outer peripheral surface of the support portion 190 have the same spacing from the belt 125. However, the support portion 190 may be positioned at any position between the motor pulley 123 and the nut pulley 143.

The support portion 190 may be formed to have a symmetrical shape on the lateral opposite sides in the rack housing 150 in a plane perpendicular to the center axis of each of the motor pulley 123 and the nut pulley 143. The support portion 190 may be provided with a second magnetic body 180 on each of the lateral opposite sides of the outer surface thereof.

In order to ensure that the attractive force can be applied to the belt 125 at the position where the chord vibration of the belt 125 occurs most severely, a first contact portion 181, at which the outer circumferential surface of the motor pulley 123 and the inner surface of the belt 125 start to come into contact with each other, and a second contact portion 183, at which the outer circumferential surface of the nut pulley 143 and the inner surface of the belt 125 start to come into contact with each other, may be provided. The second magnetic body 180 may be provided on the outer circumferential surface of the support portion 190 at a position closest to the intermediate position between the first contact portion 181 and the second contact portion 183.

Some exemplary embodiments of the present disclosure may prevent the chord vibration of the belt, which occurs when the motor pulley is continuously rotated in the forward and reverse directions by the driving force of the motor, thereby reducing the noise of the entire rack housing.

In addition, certain exemplary embodiments of the present disclosure, even when the motor pulley is continuously rotated in the forward and reverse directions by the driving force of the motor, may maintain the constant tension of the belt coupled to the motor pulley and the nut pulley.

Although all the elements constituting embodiments of the present disclosure have been described above as being combined into a single unit or combined to be operated as a single unit, the present disclosure is not necessarily limited to such embodiments. That is, at least two elements of all structural elements may be selectively joined and operate without departing from the scope of the present disclosure.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

The above embodiments have been described merely for the purpose of illustrating the technical idea of the present disclosure, and those skilled in the art will appreciate that various modifications and changes are possible without departing from the scope and spirit of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. An electric power steering apparatus comprising:
   a motor pulley provided on a shaft of a motor;
   a nut pulley provided on an outer surface of a ball nut coupled to a rack bar via a ball;
   a belt coupled to the motor pulley and the nut pulley, the belt comprising at least one first magnetic body; and
   a rack housing enclosing at least a portion of the motor pulley, the nut pulley and the belt, the rack housing comprising at least one second magnetic body, wherein the at least one second magnetic body is provided on a surface of the rack housing facing the belt.

2. The electric power steering apparatus of claim 1, wherein the at least one first magnetic body and the at least one second magnetic body facing each other have different magnetisms.

3. The electric power steering apparatus of claim 1, wherein the at least one first magnetic body is provided over an entire outer surface of the belt.

4. The electric power steering apparatus of claim 1, wherein the at least one first magnetic body comprises a plurality of first magnetic bodies, and the plurality of first magnetic bodies are provided along an outer surface of the belt and spaced apart from each other.

5. The electric power steering apparatus of claim 1, wherein the at least one second magnetic body is provided on an inner surface of the rack housing between the motor pulley and the nut pulley.

6. The electric power steering apparatus of claim 5, wherein the at least one second magnetic body comprises a plurality of second magnetic bodies, and the plurality of second magnetic bodies are disposed symmetrically with respect to a plane connecting center axes of the motor pulley and the nut pulley.

7. The rack-assist-type electric power steering apparatus of claim 1, wherein the at least one second magnetic body is positioned in a middle between a first contact portion, in which the outer surface of the motor pulley starts to come into contact with an inner surface of the belt, and a second contact portion, in which the outer surface of the nut pulley and the inner surface of the belt start to come into contact with each other.

8. The electric power steering apparatus of claim 7, wherein the at least one second magnetic body comprises a plurality of second magnetic bodies, and the plurality of second magnetic bodies are disposed symmetrically with respect to a plane connecting center axes of the motor pulley and the nut pulley.

9. An electric power steering apparatus comprising:
   a motor provided on a shaft of a motor;
   a nut pulley provided on an outer surface of a ball nut coupled to a rack bar via a ball;
   a belt coupled to the motor pulley and the nut pulley, the belt comprising at least one first magnetic body; and a rack housing enclosing at least a portion of the motor pulley, the nut pulley and the belt, the rack housing comprising a support portion protruding from an inner surface of the rack housing between the motor pulley and the nut pulley, the support portion comprising at least one second magnetic body, wherein the second magnetic body is provided on a surface of the support portion of the rack housing facing the belt.

10. The electric power steering apparatus of claim 9, wherein the at least one first magnetic body and the at least one second magnetic body facing each other have a same magnetism.

11. The electric power steering apparatus of claim 9, wherein the first magnetic body is provided over an entire outer surface of the belt.

12. The electric power steering apparatus of claim 9, wherein the least one first magnetic body comprises a plurality of first magnetic bodies, and the plurality of first magnetic bodies are provided along an outer surface of the belt and spaced apart from each other.

13. The electric power steering apparatus of claim 9, wherein the support portion is positioned in a middle between the motor pulley and the nut pulley.

14. The electric power steering apparatus of claim 9, wherein the support portion has a symmetrical shape with respect to a plane connecting center axes of the motor pulley and the nut pulley.

15. The electric power steering apparatus of claim 9, wherein the at least one second magnetic body is provided in a middle between a first contact portion, in which an outer surface of the motor pulley starts to come into contact with an inner surface of the belt, and a second contact portion, in which an outer surface of the nut pulley and the inner surface of the belt start to come into contact with each other.

* * * * *